April 3, 1951        L. A. WICKLAND        2,547,844
DISH HOLDER AND STAND
Filed April 18, 1949
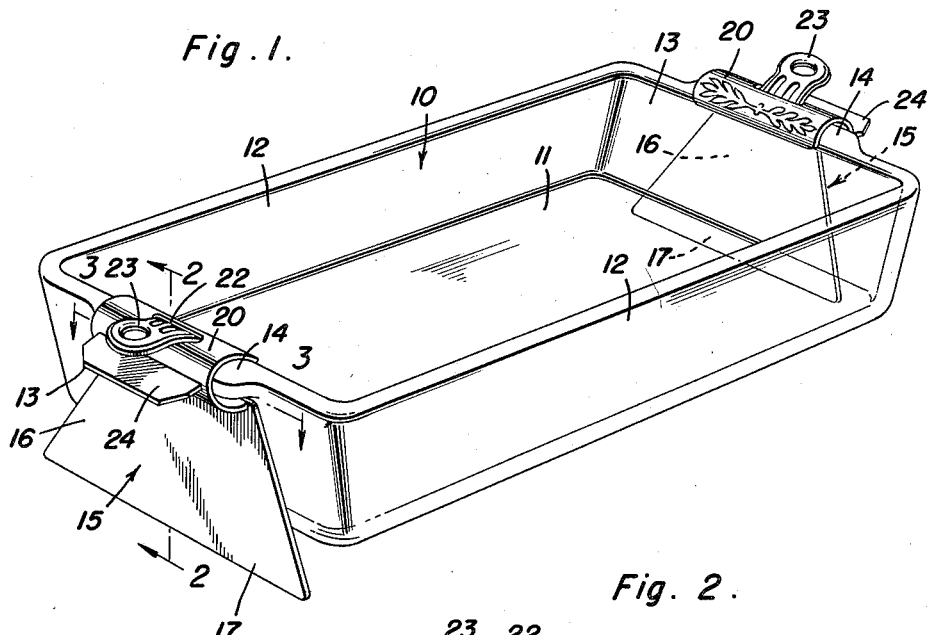
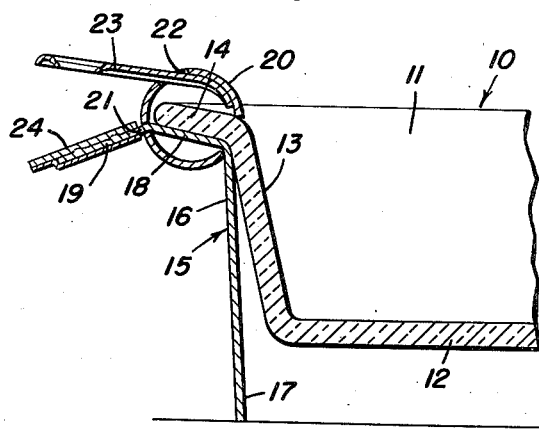
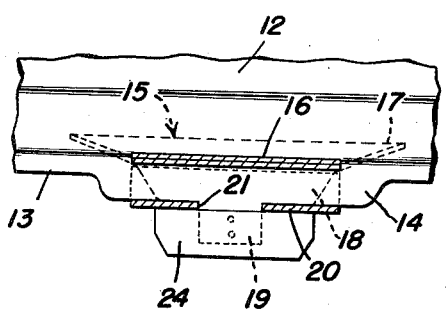
Inventor
Lawrence A. Wickland
By *Lawrence A. O'Brien and Harvey B. Jacobson*
Attorneys Patented Apr. 3, 1951

2,547,844

UNITED STATES PATENT OFFICE 2,547,844

DISH HOLDER AND STAND

Lawrence A. Wickland, Altadena, Calif.

Application April 18, 1949, Serial No. 88,172

3 Claims. (Cl. 65—61)

This invention relates to a dish holder and stand and has for its primary object to support a dish such as a handled casserole or baking dish in spaced relation to a supporting surface.

In using glass baking dishes, in which hot foods or the like are served directly from the oven, difficulty is encountered through the injury to table tops, supporting surfaces and the like through contact of the hot dish therewith and as a result heat insulating pads are frequently employed to hold the dish in spaced relation to the supporting surface. Even when such expedients are resorted to the varnish of a highly finished surface is likely to become softened to an extent sufficient to cause the fibres from which the pads are made to stick to the supporting surface and produce an unsightly spot which in many instances cannot be eradicated without refinishing the entire surface.

The primary object of this invention is to avoid the marring of supporting surfaces upon which hot dishes may be deposited.

Another object is to facilitate the handling of hot dishes and transferring them from the oven to a table or the like from which the food contained in the dish is to be served.

The above and other objects may be attained by employing this invention which embodies among its features a dish supporting leg, a dish handle engaging arm carried by the leg and extending outwardly therefrom and a dish edge engaging clip carried by the arm for detachably securing the leg to the dish handle in such a position that the dish may be supported in spaced relation to a supporting surface.

In the drawings:

Figure 1 is a perspective view of a handled dish of the type commonly employed in the baking and serving of foodstuffs;

Figure 2 is a fragmentary enlarged sectional view taken substantially along the line 2—2 of Figure 1, and Figure 3 is a fragmentary horizontal sectional view taken substantially along the line 3—3 of Figure 1.

Referring to the drawings in detail a conventional baking dish designated generally 10 comprises a bottom 11 having formed integral therewith upstanding side walls 12, and upstanding end walls 13. The end walls 13 are provided at their upper edges with outwardly extending handles 14 to which my dish holders designated generally 15 are detachably connected as will be more fully hereinafter described. Each detachable stand or dish holder comprises a leg portion 16, opposite side edges of which diverge to form a relatively broad foot portion 17. The leg 16 is preferably stamped from sheet metal, and formed at its upper end and extending outwardly therefrom is a handle engaging arm 18. As illustrated the arm 18 is formed at the convergent end of the leg 16, and lies at an obtuse angle with relation thereto so as to conform to the contour of the outer face of the end wall 13 of the dish and the underside of an adjacent handle thereof, thus to form a support upon which the dish may rest. The leg 16 is of a length greater than the depth of the end wall of the dish 10 so that it will project below the bottom 12 of the dish as illustrated in Figure 2, to support the bottom of the dish in spaced relation to a supporting surface. Formed integral with the arm 18 and extending from the edge thereof remote from the leg 16 at an obtuse angle with relation thereto is a tongue 19 which is of considerable less width than the arm 18 as will be readily understood upon reference to Figure 3.

Encircling the arm 18 is a C-shaped spring 20, one jaw member of which engages the leg 16 at its junction with the arm 18, and formed in said spring 20 remote from the jaw members thereof are spaced parallel elongated longitudinal slots 21 and 22. A suitable handle member 23 extends through the slot 22 and projects outwardly from the spring 20 in a direction opposite the jaw members thereof, and the tongue 19 of the arm 18 extends through the slot 21 so that when pressure is applied on the handle member 23 and tongue 19 to advance them toward one another, the jaw members of the spring 20 will be opened. Welded or otherwise fixed to the tongue 19 and overlying the exterior of the spring 20 adjacent the slot 21 is a stop member 24 which, being substantially wider than the tongue, also serves as a grip for cooperation with the handle member 23 in opening the jaws of the spring 20 and also a grip by which the user may lift the device when it is in place on a dish.

In use a dish to be lifted and supported in spaced relation to a surface is first extracted from the oven after which the two stands are moved toward the sides or ends of the dish carrying the handles 14 with the jaws of the C-spring 20 held open. The foot 17 of each leg 16 is then advanced beneath the dish bottom 12 and upon rocking the legs 16 upwardly, the arms 18 will be brought into engagement with the undersides of the handles 14. When the arms 18 fully engage the undersides of the handles 14, the legs 16 will lie in spaced relation to the portions of the dish 10 immediately below the handles as suggested in Figure 2, and upon releasing the pressure on the spring 20, the jaws thereof will close into engagement with the legs 16 adjacent the junction with the arm 18 and the opposite jaw of the spring will engage the handle 14 adjacent its junction with the wall 13 of the dish 10, thus firmly clamping the stands on the dish. The stop members 14 may then be employed as grips to facilitate the carrying of the dish, and upon lifting the dish it may be transported to the surface upon which it is to be supported and the feet 17 of the legs 16 will rest on the surface with the dish bottom 12 in spaced relation thereto. In this way the dish will be held in spaced relation to the surface upon which it is supported and a space will be formed between the bottom of the dish and the surface for the circulation of air so that heat radiated downwardly from the bottom of the dish will be dissipated before injury can occur to the surface upon which the feet rest.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

1. In a detachable dish holder and stand, a dish supporting leg, a dish handle engaging arm carried by said leg and extending outwardly therefrom, a longitudinally split tubular spring carried by the arm in encircling relation therewith, one longitudinal edge of said spring engaging the leg at its junction with the arm and urging the arm against the underside of a dish handle, and the opposite edge of said spring engaging the top of the dish handle adjacent its junction with the dish.

2. In a detachable dish holder and stand, a dish supporting leg, a dish handle engaging arm carried by said leg and extending outwardly therefrom, a longitudinally split tubular spring carried by the arm in encircling relation therewith, one longitudinal edge of said spring engaging the leg at its junction with the arm and urging the arm against the underside of a dish handle and the opposite edge of said spring engaging the top of the dish handle adjacent its junction with the dish, and a spring releasing lever carried by the tubular spring and projecting outwardly therefrom on the side thereof remote from the leg for coaction with said arm.

3. In a detachable dish holder and stand, a dish supporting leg adapted to engage the side of a handled dish beneath the handle thereof and hold the bottom of the dish in spaced relation to a supporting surface, an arm carried by the leg and extending outwardly therefrom, said arm engaging the under side of a handle on said dish, a tongue carried by the arm and extending angularly therefrom at an acute angle to the leg, a longitudinally split tubular spring having an elongated longitudinal slot therein circumferentially spaced from the split thereof, the tongue on the arm extending through the slot and the arm extending through the split in the spring, a grip member carried by the tongue and holding said arm and spring assembled, and a lever carried by the spring and extending outwardly therefrom for cooperation with the grip member in opening the spring along the split therein.

LAWRENCE A. WICKLAND.

REFERENCES CITED

The following references are of record in the file of this patent:

UNITED STATES PATENTS

| Number | Name | Date |
| --- | --- | --- |
| 511,189 | Barthold | Dec. 19, 1893 |
| 629,799 | Marsh | Aug. 1, 1899 |
| 784,803 | Moylan | Mar. 14, 1905 |
| 923,906 | Spry | June 8, 1909 |
| 1,235,206 | Kilkenny | July 31, 1917 |
| 1,637,227 | McDaniel | July 26, 1927 |
| 1,934,528 | Faries | Nov. 7, 1933 |
| 2,149,971 | Liebmann | Mar. 7, 1939 |
| 2,211,030 | Rutenber | Aug. 13, 1940 |
| 2,212,065 | Fischer | Aug. 20, 1940 |
| 2,411,864 | Birkin | Dec. 3, 1946 |